(12) United States Patent
Bernal et al.

(10) Patent No.: US 10,101,922 B1
(45) Date of Patent: Oct. 16, 2018

(54) ADDRESSING USAGE OF SHARED SSD RESOURCES IN VOLATILE AND UNPREDICTABLE OPERATING ENVIRONMENTS

(71) Applicant: INTERNATIONAL BUSINESS MACHINES CORPORATION, Armonk, NY (US)

(72) Inventors: Edward R. Bernal, Raleigh, NC (US); Ivan M. Heninger, Selma, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/609,543

(22) Filed: May 31, 2017

(51) Int. Cl.
*G06F 12/00* (2006.01)
*G06F 3/06* (2006.01)

(52) U.S. Cl.
CPC .......... *G06F 3/0613* (2013.01); *G06F 3/0604* (2013.01); *G06F 3/0611* (2013.01); *G06F 3/0614* (2013.01); *G06F 3/0647* (2013.01); *G06F 3/0649* (2013.01); *G06F 3/0655* (2013.01); *G06F 3/0685* (2013.01); *G06F 3/0689* (2013.01); *G06F 3/0665* (2013.01)

(58) Field of Classification Search
None
See application file for complete search history.

(56) References Cited

U.S. PATENT DOCUMENTS

| 8,346,935 | B2 | 1/2013 | Mayo et al. |
| 8,959,217 | B2 | 2/2015 | Mayo et al. |
| 9,158,463 | B2 * | 10/2015 | Oe .................. G06F 3/0611 |
| 9,471,228 | B2 * | 10/2016 | van Riel ........... G06F 3/061 |
| 2016/0179390 | A1 | 6/2016 | Guo et al. |

OTHER PUBLICATIONS

Carlson, "A different approach to solid state storage in the cloud", SNIA Europe, http://www.dcseuropeinfo/n/ngkv, Oct. 2015, 3 pages.
(Continued)

*Primary Examiner* — Midys Rojas
(74) *Attorney, Agent, or Firm* — William Hartwell; Andrew D. Wright; Roberts Mlotkowski Safran Cole & Calderon, P.C.

(57) ABSTRACT

Systems and methods for optimizing storage system performance are disclosed. A method includes: determining an expected lifetime of each of at least one computing instance; determining a disk data extent evaluation period for each of the at least one computing instance based on the determined expected lifetime; determining an input/output (I/O) wait time threshold for each of the at least one computing instance; determining an I/O wait time of each of the at least one computing instance using the determined disk data extent evaluation period; and in response to the determined I/O wait time of one or more of the at least one computing instance exceeding the determined I/O wait time threshold of the computing instance, moving at least one data extent associated with the one or more computing instance exceeding the determined I/O wait time threshold from hard disk drive storage to solid state drive storage.

20 Claims, 6 Drawing Sheets

(56) References Cited

OTHER PUBLICATIONS

Anonymously, "Method and System for Prolonging Life of Solid State Drives (SSDs) Using Redundant Array of Independent Disks (RAID)", ip.com, Apr. 7, 2011, 4 pages.
Anonymously, "SSD/HDD: Dynamic Modification of Raid Arrays to Ensure Globally Optimized Performance", ip.com, Jun. 2, 2010, 4 pages.
Anonymously, "Database Exploitation of Solid State Drives", ip.com, Mar. 15, 2011, 3 pages.
Kasavajhala, "Solid State Drive vs. Hard Disk Drive Price and Performance Study", May 2011, 16 pages.
Mell et al., "The NIST Definition of Cloud Computing", NIST, Special Publication 800-145, Sep. 2011, 7 pages.

\* cited by examiner

US 10,101,922 B1

ADDRESSING USAGE OF SHARED SSD RESOURCES IN VOLATILE AND UNPREDICTABLE OPERATING ENVIRONMENTS

BACKGROUND

The present invention generally relates to storage systems and, more particularly, to a system and method for optimizing performance of storage systems that include solid state drives (SSD) and magnetic hard disk drives (HDD).

Storage systems support SSDs that may provide various benefits over HDDs, such as faster data access and throughput, better performance, and less power consumption. SSDs are capable of reading and writing data much more quickly than HDDs. For example, SSDs may be capable of 500 or more I/O operations per second (IOPS), while HDDs may be capable of only 150 IOPS. Accordingly, by moving frequently accessed data extents to SSD storage, the performance of a storage system may be optimized.

SDDs may be more expensive than HDDs and therefore the total storage volume in a storage system may be provided by a mix of HDDs and SDDs. To optimize the performance of a storage system that includes both HDDs and SSDs, infrequently accessed data extents may be located on HDDs due to their lower cost and frequently accessed data extents may be located on SSDs due to their higher performance.

Systems may optimize storage system performance by relocating data extents after an extended evaluation period in order to optimize performance. The evaluation period used by optimizers is long and static. During this evaluation period, typically between two and 14 days elapse prior to the optimizer moving data extents between HDDs and SDDs.

SUMMARY

In a first aspect of the invention, there is a method that includes: determining, by a computer device, an expected lifetime of each of at least one computing instance; determining, by the computer device, a disk data extent evaluation period for each of the at least one computing instance based on the determined expected lifetime of the computing instance; determining, by the computer device, an input/output (I/O) wait time threshold for each of the at least one computing instance; determining, by the computer device, an I/O wait time of each of the at least one computing instance using the determined disk data extent evaluation period for the computing instance; and in response to the determined I/O wait time of one or more of the at least one computing instance exceeding the determined I/O wait time threshold of the computing instance, moving, by the computer device, at least one data extent associated with the one or more computing instance exceeding the determined I/O wait time threshold from HDD storage to SSD storage.

In another aspect of the invention, there is a computer program product that includes a computer readable storage medium having program instructions embodied therewith. The program instructions are executable by a computing device to cause the computing device to: determine an expected lifetime of each of at least one data extent associated with at least one computing instance; determine a disk data extent evaluation period for each of the at least one data extent associated with the at least one computing instance based on the determined expected lifetime of the data extent; determine an I/O wait time threshold for each of the at least one data extent associated with the at least one computing instance; determine an I/O wait time of each of the at least one data extent associated with the at least one computing instance using the determined disk data extent evaluation period for the data extent; and in response to the determined I/O wait time of one or more of the at least one data extent associated with the at least one computing instance exceeding the determined I/O wait time threshold of the data extent, move at least one of the one or more of the at least one data extent associated with the at least one computing instance exceeding the determined I/O wait time threshold from HDD storage to SSD storage.

In another aspect of the invention, there is a system that includes: a storage system that includes HDD storage and SSD storage; and a controller that includes: at least one hardware processor; an expected lifetime determiner configured to determine an expected lifetime of each of at least one computing instance, using at least one hardware processor; a disk data extent evaluation period determiner configured to determine a disk data extent evaluation period for each of the at least one computing instance based on the expected lifetime of the computing instance determined by the expected lifetime determiner, using at least one hardware processor; an input/output (I/O) wait time threshold determiner configured to determine an I/O wait time threshold for each of the at least one computing instance using at least one hardware processor; an I/O wait time determiner configured to determine an I/O wait time of each of the at least one computing instance using the disk data extent evaluation period for the computing instance determined by the disk data extent evaluation period determiner, using at least one hardware processor; and a data extent mover configured to, in response to the I/O wait time of one or more of the at least one computing instance determined by the I/O wait time determiner exceeding the I/O wait time threshold of the computing instance determined by the I/O wait time threshold determiner, move at least one data extent associated with the one or more computing instance exceeding the determined I/O wait time threshold from the HDD storage in the storage system to the SSD storage in the storage system.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
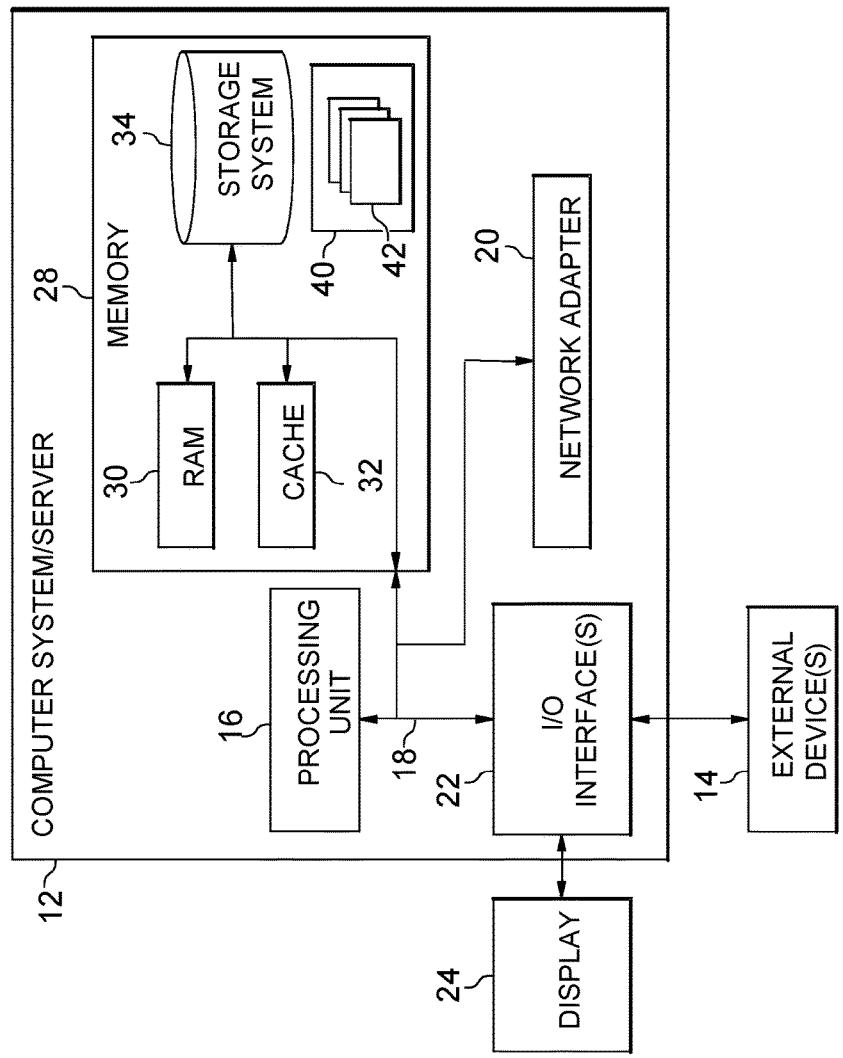
FIG. 1 depicts a cloud computing node according to an embodiment of the present invention.

The present invention generally relates to storage systems and, more particularly, to a system and method for optimizing performance of storage systems that include SSDs and HDDs. Aspects of the invention are directed to evaluating the relative "hotness" (i.e., access frequency) of data extents using an evaluation period that is dynamically determined based on an expected lifetime of a computing instance. By dynamically determining the evaluation period, disk resources available to both short-term transient and long term computing instances may be balanced. The computing instance may be a cloud computing instance, and the evaluation may be performed by a cloud controller. Aspects of the invention may accelerate the movement of data extents from HDD to SSD and back for shorter lived computing instances.

Aspects of the invention may determine the disk data extent evaluation period based on the expected lifetime of the cloud computing instance(s), instead of on a fixed evaluation period. For example, the evaluation period may be determined dynamically based on information that a cloud controller has on the current and expected disk workload. Shorter dynamic evaluation periods may be beneficial in environments such as shared cloud environments. These environments may experience shorter term I/O spikes, as driven by shorter term cloud computing instance life spans, and accordingly may benefit from the use of SSD. Aspects of the invention may speed up I/O intensive short term workloads for cloud products. High priority workloads that run concurrently with other "regular" workloads in a shared storage environment may benefit from improved performance.

As described herein, aspects of the invention may include a method comprising: determining, by a computer device, an expected lifetime of each of at least one computing instance; determining, by the computer device, a disk data extent evaluation period for each of the at least one computing instance based on the determined expected lifetime of the computing instance; determining, by the computer device, an I/O wait time threshold for each of the at least one computing instance; determining, by the computer device, an I/O wait time of each of the at least one computing instance using the determined disk data extent evaluation period for the computing instance; and in response to the determined I/O wait time of one or more of the at least one computing instance exceeding the determined I/O wait time threshold of the computing instance, moving, by the computer device, at least one data extent associated with the one or more computing instance exceeding the determined I/O wait time threshold from HDD storage to SSD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
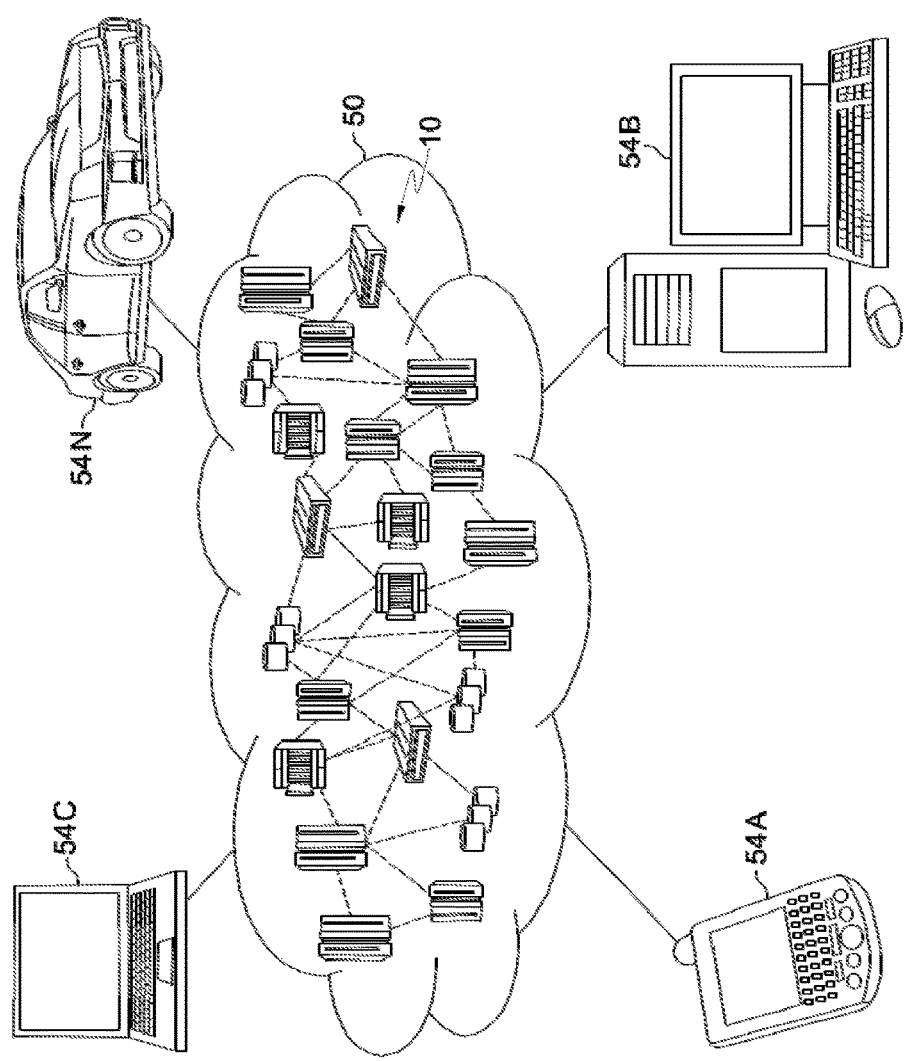
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
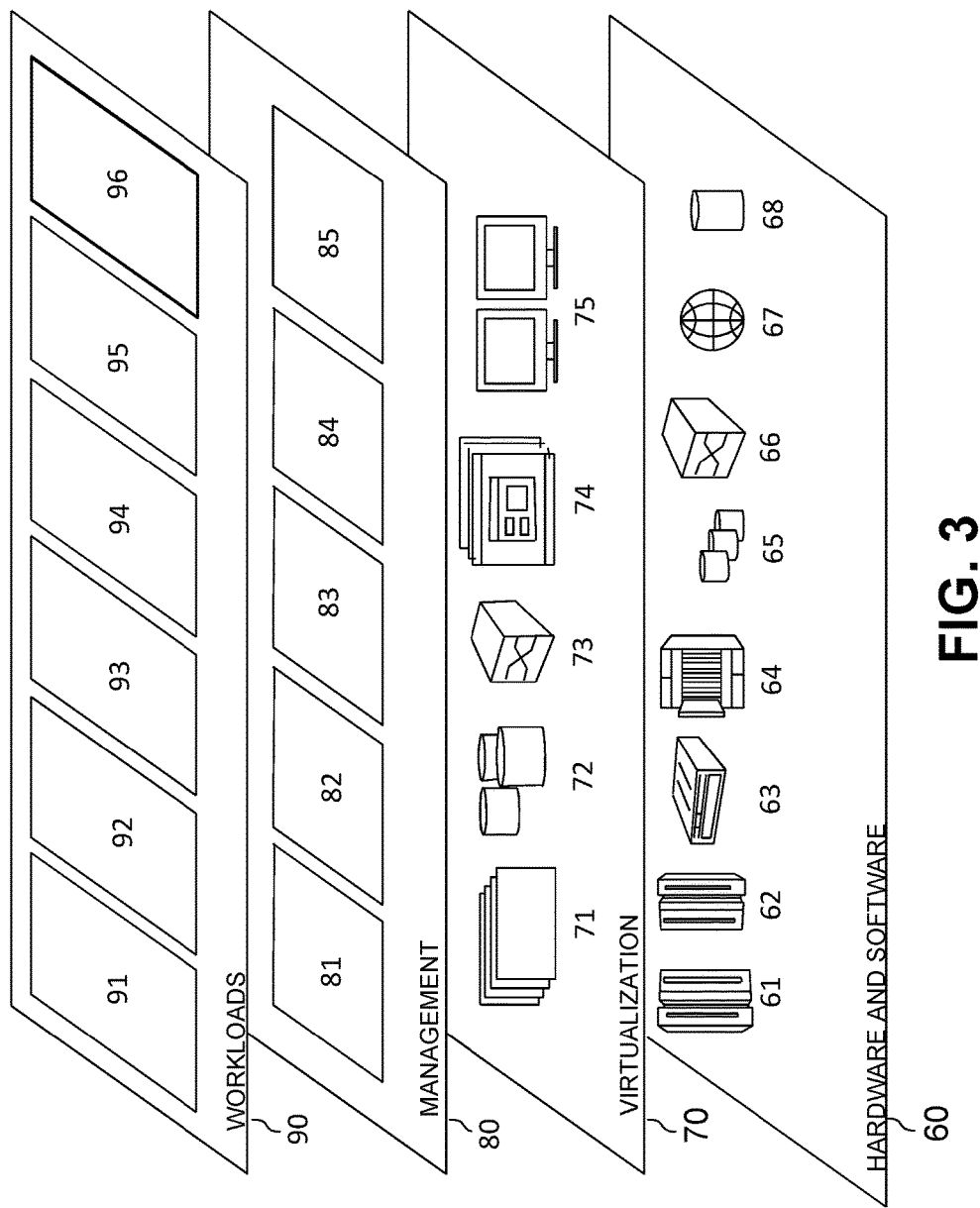
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Referring back to FIG. 1, the program/utility 40 may include one or more program modules 42 that generally carry out the functions and/or methodologies of embodiments of the invention as described herein (e.g., such as the functionality provided by resource provisioning 81). Specifically, the program modules 42 may determine an expected lifetime of each of at least one computing instance; determine a disk data extent evaluation period for each of the at least one computing instance based on the determined expected lifetime of the computing instance; determine an I/O wait time threshold for each of the at least one computing instance; determine an I/O wait time of each of the at least one computing instance using the determined disk data extent evaluation period for the computing instance; and in response to the determined I/O wait time of one or more of the at least one computing instance exceeding the determined I/O wait time threshold of the computing instance, move at least one data extent associated with the one or more computing instance exceeding the determined I/O wait time threshold from HDD storage to SSD storage. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cloud controller 410 as shown in FIGS. 4 and 5.

Figure 4:
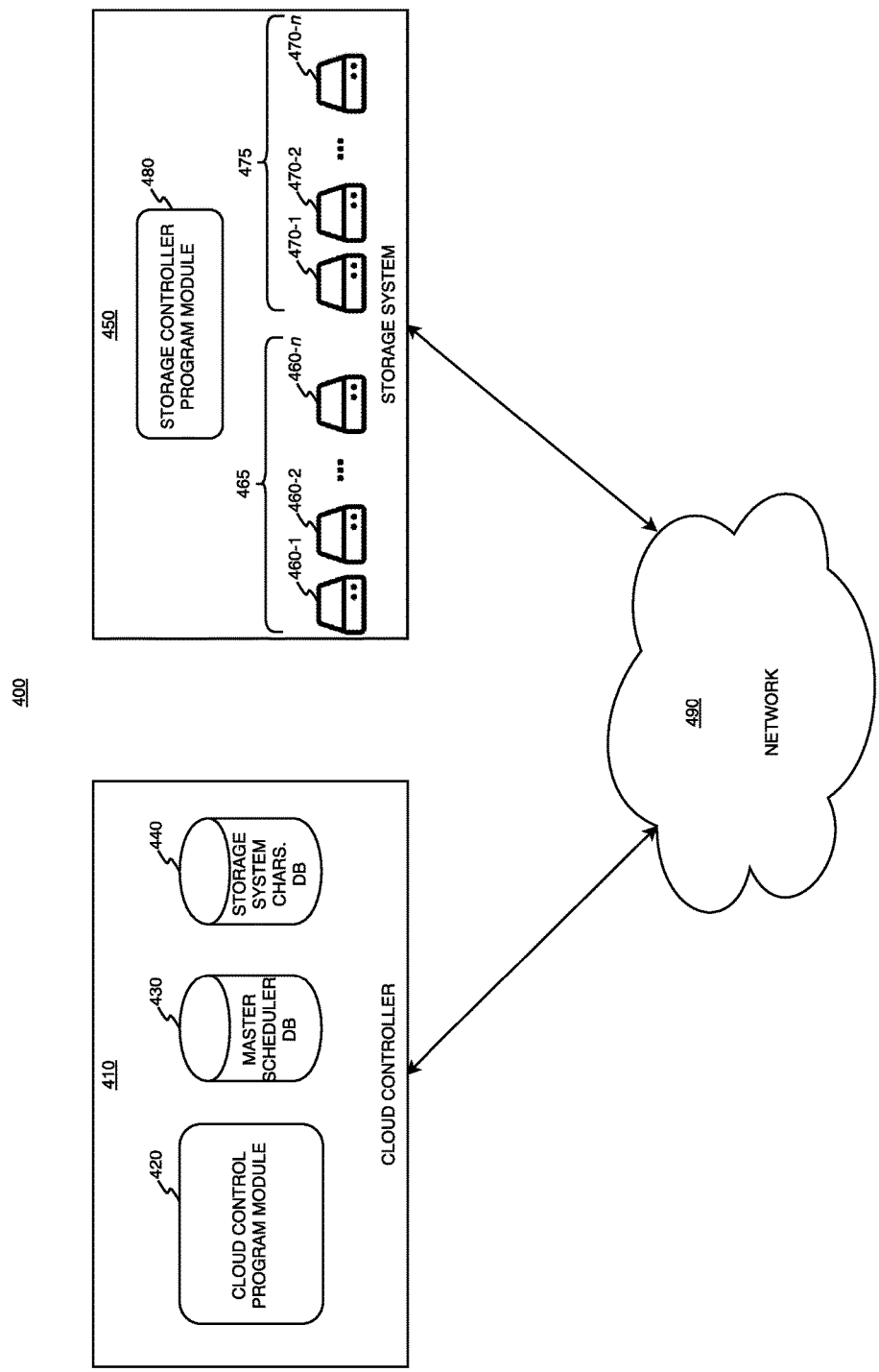
FIG. 4 shows a block diagram of an exemplary system in accordance with aspects of the invention.
Figure 5:
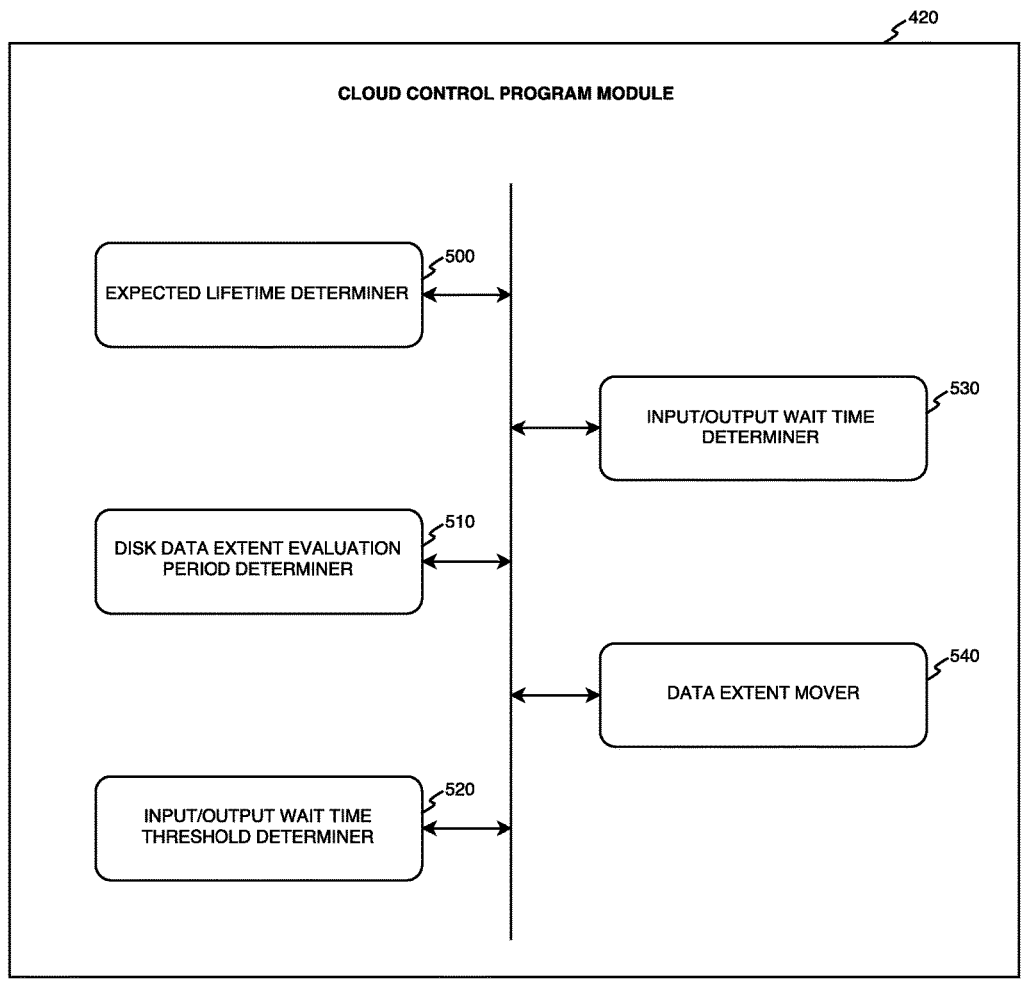
FIG. 5 shows a block diagram of an exemplary cloud control program module in accordance with aspects of the invention.

FIG. 4 shows a block diagram of an exemplary system 400 in accordance with aspects of the invention. The system 400 includes a cloud controller 410 that communicates with a storage system 450 via a computer network 490. The network 490 may be any suitable network such as a LAN, WAN, or the Internet. The cloud controller 410 and the storage system 450 may be physically collocated, or may be situated in separate physical locations.

The cloud controller 410 may be situated in the cloud computing environment 50 on one or more of the nodes 10 shown in FIG. 2. The cloud controller 410 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

The storage system 450 may also be situated in the cloud computing environment 50 on one or more of the nodes 10 shown in FIG. 2. The storage system 450 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

According to an embodiment, the cloud controller 410 may include a cloud control program module 420, a master scheduler database 430, and a storage system characteristics database 440.

The cloud control program module 420 according to an embodiment may include hardware and/or software and may be one or more of the program modules 42 shown in FIG. 1. According to an embodiment, the cloud control program module 420 includes program instructions for executing a cloud control program. The program instructions included in the cloud control program module 420 of the cloud controller 410 may be executed by one or more hardware processors. According to an embodiment, the cloud control program performs functions related to optimizing the performance of storage systems, as discussed below. The cloud control program may also perform other functions, for example, creating and destroying capacity (i.e., automatically scaling cloud computing instances or jobs).

According to embodiment, the cloud control program of the cloud control program module 420 may function as follows: (1) each time a job starts, the cloud control program may obtain information about the job from the master scheduler database 430; (2) the cloud control program may also obtain access information for the cloud instance where the job is running; (3) the cloud control program may obtain information about all of the "competing" jobs that are either currently running or will start to run before the job completes, including all jobs whose current status is "running" and all jobs whose current status is "idle" but are estimated to start before the job completes; (4) given all of the above information that was collected, the cloud control program may then periodically monitor the I/O wait time, based on the I/O monitor interval in the master scheduler database 430, to determine if it has exceeded a threshold for the job;

and (5) based on the job exceeding the threshold, the job is now eligible to have data extents migrated to faster storage medium (i.e., SSD or flash).

A policy based approach may be used to determine how to move data extents for all relevant jobs to the best class of storage medium, so that I/O wait time is minimized based on real time job priority. The cloud control program uses these policies to direct the data of higher priority jobs to faster storage resources.

Still referring to FIG. 4, the master scheduler database 430 according to an embodiment may be included within the cloud controller 410 or may be separate from the cloud controller 410 but in communication therewith. The master scheduler database 430 may be implemented as any type of database. The cloud controller 410 may interact with the master scheduler database 430 and access data therein using any general-purpose database management system or a special-purpose database management system. The cloud controller 410 may interact with the master scheduler database 430 and access data therein using structured query language (SQL), open database connectivity (ODBC), Java database connectivity (JDBC), or any other method. The master scheduler database 430 may be a relational database, an object database, a NoSQL database, a flat file database, an extensible markup language (XML) database, or any other organized collection of data.

The master scheduler database 430 according to an embodiment may store information including but not limited to (1) a job name, (2) a job description, (3) a job schedule, (4) a job start time, (5) an estimated job duration, (6) an estimated storage amount accessed, (5) a job priority, (6) an I/O wait time threshold, (7) an I/O monitor interval, and/or (8) a current job status.

The job name stored in master scheduler database 430 according to an embodiment may be a name for a particular cloud computing instance or job. In an exemplary scenario where a large retail organization is having a one day sale on their public internet site which is hosted in a shared cloud environment, the job name may be a name that identifies the cloud computing instance as being associated with the one day sale.

The job schedule stored in master scheduler database 430 according to an embodiment may include information on particular days of the week when the particular cloud computing instance or job will run (e.g., Monday/Wednesday/Friday) or particular dates when a job will run. The job start time may be a time of day when the particular cloud computing instance or job will start. The estimated job duration may be an estimated length of time the particular cloud computing instance or job will run or may be an estimated completion time and date for the particular cloud computing instance or job.

The estimated storage amount accessed stored in master scheduler database 430 according to an embodiment may include information about the size of various data extents accessed by the particular cloud computing instance (e.g., in bytes, kilobytes, megabytes, gigabytes, terabytes, petrabytes, exabytes, or any other unit) or job including information about an amount information read or written from the various data extents by the particular cloud computing instance or job.

The job priority stored in master scheduler database 430 according to an embodiment may be a value selected from a set of predefined values and may indicate a priority level of a particular cloud computing instance or job. For example, the job priority may 0 to indicate a high priority job, 1 to indicate a normal priority job, or 2 to indicate a low priority job. Any other set of predefined values may be used instead. Alternatively, the job priority may be an arbitrary value representing a relative priority of a particular cloud computing instance or job in relation to other cloud computing instances or jobs. For example, a set of cloud computing instances or jobs may be assigned various values ranging from 0 to 100, with the cloud computing instance or job having the assigned priority closest to 0 having the highest priority and the cloud computing instance or job having the assigned priority closest to 100 having the lowest priority.

The I/O wait time threshold stored in master scheduler database 430 according to an embodiment may be a maximum acceptable percentage of time that a CPU used by a particular cloud computing instance or job is blocked waiting for synchronous acknowledgement that a disk write was successful. For example, for a particular cloud computing instance or job, the I/O wait time threshold may be 5%, or it may be 20%.

According to another embodiment, the I/O wait time threshold may be a maximum acceptable length of time that a CPU used by a particular cloud computing instance or job is blocked waiting for synchronous acknowledgement that a disk write was successful. According to yet another embodiment, the I/O wait time threshold may be a maximum percentage or length of time that a CPU used by a particular cloud computing instance or job is I/O bound, or in other words, waiting for I/O operations to be completed. A CPU used by a particular cloud computing instance or job may be I/O bound when more time is spent requesting data than processing data.

The I/O monitor interval stored in master scheduler database 430 according to an embodiment may be a static or rolling window over which average I/O wait time for a particular cloud computing instance or job is measured. According to another embodiment, the I/O monitor interval may be an interval at which a point-in-time I/O wait time for a particular cloud computing instance or job is measured.

The current job status stored in master scheduler database 430 according to an embodiment may be information indicating whether a particular cloud computing instance or job is running or not running.

The master scheduler database 430 may store other information instead of or in addition to the information described above. Additionally, the master scheduler database 430 may omit various information described above.

The storage system characteristics database 440 according to an embodiment may be included within the cloud controller 410 or may be separate from the cloud controller 410 but in communication therewith. The storage system characteristics database 440 may be implemented as any type of database. The cloud controller 410 may interact with the storage system characteristics database 440 and access data therein using any general-purpose database management system or a special-purpose database management system. The cloud controller 410 may interact with the storage system characteristics database 440 and access data therein using structured query language (SQL), open database connectivity (ODBC), Java database connectivity (JDBC), or any other method. The storage system characteristics database 440 may be a relational database, an object database, a NoSQL database, a flat file database, an extensible markup language (XML) database, or any other organized collection of data.

The storage system characteristics database 440 according to an embodiment may store information related to the storage system 450, including but not limited to (1) number and type of disk drives, (2) total usable storage by type, (3) redundant array of independent disks (RAID) information, and/or (4) access information for the storage system 450.

The information on the number and type of disk drives stored in the storage system characteristics database 440 according to an embodiment may include information on a number of HDDs and a number of SSDs in the storage system 450.

The information on total usable storage by type stored in the storage system characteristics database 440 according to an embodiment may include information on the total size of storage (e.g., in bytes, kilobytes, megabytes, gigabytes, terabytes, petrabytes, exabytes, or any other unit) available across all of the HDDs in the storage system 450 as well as information on the total size of storage available across all of the SSDs in the storage system 450.

The RAID information stored in the storage system characteristics database 440 according to an embodiment may include information as a RAID level of the storage system 450 and stripe size utilized in the storage system 450.

The access information for the storage system 450 stored in the storage system characteristics database 440 according to an embodiment may include information to enable access to real time information regarding the storage system 450 and/or information to enable requests or commands to be sent to the storage system 450.

The storage system 450 may be situated in the cloud computing environment 50 on one or more of the nodes 10 shown in FIG. 2. The storage system 450 may be shared by multiple cloud computing instances or jobs. In other words, data extents associated with multiple cloud computing instances or jobs may be stored in the storage system 450.

The storage system 450 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

According to an embodiment, the storage system 450 shown in FIG. 4 may include one or more HDDs 460-1, 460-2, . . . , 460-n forming a HDD storage array 465. The storage system 450 may further include one or more SSDs 470-1, 470-2, . . . , 470-n forming an SSD storage array 475. The HDDs 460-1, 460-2, . . . , 460-n forming the HDD storage array 465 may be physically collocated, or may be situated in separate physical locations. The SSDs 470-1, 470-2, . . . , 470-n forming the SSD storage array 475 may be physically collocated, or may be situated in separate physical locations. Likewise, the HDD storage array 465 and the SSD storage array 475 may be physically collocated, or may be situated in separate physical locations.

The storage system 450 may also include a storage controller program module 480. The storage controller program module 480 according to an embodiment may include hardware and/or software and may be one or more of the program modules 42 shown in FIG. 1. The storage controller program module 480 according to an embodiment may include program instructions for executing a storage controller program. The program instructions included in the storage controller program module 480 of the storage system 450 may be executed by one or more hardware processors. According to an embodiment, the storage controller program performs functions related to the implementation, maintenance, and administration of the storage system 450, as discussed below, as well as other functions.

FIG. 5 shows a block diagram of an exemplary cloud control program module 420 in the cloud controller 410 in accordance with aspects of the invention. In embodiments, the cloud control program module 420 includes an expected lifetime determiner 500, a disk data extent evaluation period determiner 510, an input/output wait time threshold determiner 520, an input/output wait time determiner 530, and a data extent mover 540.

The expected lifetime determiner 500 of the cloud control program module 420 in the cloud controller 410 according to an embodiment determines an expected lifetime for each cloud computing instance or job in the cloud computing environment 50. Alternatively, the expected lifetime determiner 500 may determine an expected lifetime for one or more data extents stored in the storage system 450 and associated with each cloud computing instance or job in the cloud computing environment 50.

For example, according to an embodiment, the expected lifetime determiner 500 may retrieve information from the master scheduler database 430, for each cloud computing instance or job, regarding the job schedule, the job start time, and/or the estimated job duration and may determine an expected lifetime for each cloud computing instance or job using the retrieved information. The job schedule, the job start time, and/or the estimated job duration may be previously provided by or stored in the master scheduler database 430 by another program, controller, or process, or may have been previously provided by or stored in the master scheduler database 430 by an administrator, customer, or other user.

Alternatively, according to another embodiment, the expected lifetime determiner 500 may use a predetermined expected lifetime for each cloud computing instance or job previously provided by or stored in the master scheduler database 430 by another program, controller, or process, or previously provided by or stored in the master scheduler database 430 by an administrator, customer, or other user.

The disk data extent evaluation period determiner 510 of the cloud control program module 420 in the cloud controller 410 according to an embodiment determines a disk data extent evaluation period for each cloud computing instance or job in the cloud computing environment 50, or for one or more data extents stored in the storage system 450 and associated with each cloud computing instance or job in the cloud computing environment 50, based on the expected lifetime determined by the expected lifetime determiner 510.

For example, the disk data extent evaluation period determiner 510 according to an embodiment may determine a relatively shorter disk data extent evaluation period for a cloud computing instance or job having a relatively shorter expected lifetime as determined by the expected lifetime determiner 510. Likewise, the disk data extent evaluation period determiner 510 according to an embodiment may determine a relatively longer disk data extent evaluation period for a cloud computing instance or job having a relatively longer expected lifetime as determined by the expected lifetime determiner 510. According to an embodiment, the disk data extent evaluation period determiner 510 may store information into the master scheduler database 430, for each cloud computing instance or job, regarding the determined disk data extent evaluation period (e.g., as an I/O monitor interval).

By way of a non-limiting example, for a cloud computing instance or job having an expected lifetime of 365 days, the disk data extent evaluation period determiner 510 may determine a disk data extent evaluation period of 14 days, or an evaluation period of two days, or any other period. On the other hand, for a cloud computing instance or job having an expected lifetime of one day, the disk data extent evaluation period determiner 510 may determine a disk data extent evaluation period of one hour, or ten minutes, or any other number.

Alternatively, according to another embodiment, the disk data extent evaluation period determiner 510 may retrieve information from the master scheduler database 430 (e.g., information regarding a predetermined I/O monitor interval), for each cloud computing instance or job, and use the retrieved information to determine the disk data extent evaluation period. The I/O monitor interval may be previously provided by or stored in the master scheduler database 430 by another program, controller, or process, or may have been previously provided by or stored in the master scheduler database 430 manually by an administrator, customer, or other user.

According to yet another embodiment, the disk data extent evaluation period determiner 510 may use a predetermined disk data extent evaluation period for each cloud computing instance or job, based on the expected lifetime of the computing instance.

The input/output wait time threshold determiner 520 of the cloud control program module 420 in the cloud controller 410 according to an embodiment determines an I/O wait time threshold for each cloud computing instance or job in the storage system 450. For example, the input/output wait time threshold determiner 520 may retrieve from the master scheduler database 430, for each cloud computing instance or job, information regarding the I/O wait time threshold. The information regarding the I/O wait time threshold may be previously provided by or stored in the master scheduler database 430 by another program, controller, or process, or may have been previously provided by or stored in the master scheduler database 430 by an administrator, customer, or other user.

According to another embodiment, the input/output wait time threshold determiner 520 may determine the I/O wait time threshold based upon information about a job priority provided by or stored in the master scheduler database 430 by another program, controller, or process, or previously provided by or stored in the master scheduler database 430 by an administrator, customer, or other user. The wait time threshold determiner 520 may store information in the master scheduler database 430 about the determined I/O wait time threshold.

The input/output wait time determiner 530 of the cloud control program module 420 in the cloud controller 410 according to an embodiment determines an I/O wait time for each cloud computing instance or job in the storage system 450 using the disk data extent evaluation period for the computing instance determined by the disk data extent evaluation period determiner 510. The I/O wait time determined by the input/output wait time determiner 530 may be an average I/O wait time for a particular cloud computing instance or job as measured over the disk data extent evaluation period for the computing instance determined by the disk data extent evaluation period determiner 510. According to another embodiment, the I/O wait time determined by the input/output wait time determiner 530 may be a point-in-time I/O wait time for a particular cloud computing instance or job, as measured at an interval corresponding to the disk data extent evaluation period for the computing instance determined by the disk data extent evaluation period determiner 510.

The data extent mover 540 of the cloud control program module 420 in the cloud controller 410 according to an embodiment determines whether or not the I/O wait time as determined by the input/output wait time determiner 530 for one or more cloud computing instance or job exceeds the I/O wait time threshold determined by the input/output wait time threshold determiner 520. If the data extent mover 540 determines that the I/O wait time as determined by the input/output wait time determiner 530 exceeds the I/O wait time threshold determined by the input/output wait time threshold determiner 520, then the data extent mover 540 causes one or more data extents to be moved from the HDD storage array 465 of the storage system 450 to the SSD storage array 475 of the storage system 450, if the SSD storage array 475 has sufficient space to store the one or more data extents. According to an embodiment, in the event that the SSD storage array 475 of the storage system 450 does not have sufficient space to store the one or more data extents (e.g., the SSD storage array 475 may be at capacity or nearly at capacity), the data extent mover 540 may cause one or more data extents that are less frequently accessed, as compared to the one or more data extents to be moved to the SSD storage array 475, to be moved from the SSD storage array 475 of the storage system 450 to the HDD storage array 465 of the storage system 450. Provided that sufficient space has been made available by such movement, the data extent mover 540 may then cause the one or more data extents to be moved from the HDD storage array 465 of the storage system 450 to the SSD storage array 475 of the storage system 450.

According to an embodiment, when, for multiple cloud computing instances or jobs, the I/O wait time as determined by the input/output wait time determiner 530 exceeds the I/O wait time threshold determined by the input/output wait time threshold determiner 520, the data extent mover 540 may receive information about a job priority for each of the cloud computing instances or jobs exceeding the determined I/O wait time threshold. The data extent mover 540 may then use the received information about the job priority to determine particular cloud computing instances or jobs for which to move data extents, if the SSD storage array 475 of the storage system 450 has space, or if space can be made available as discussed above. This movement may be performed at various times, such as during a period of low usage. The data extent mover 540 may maintain a schedule of times at which data extents may be moved.

By way of a non-limiting example, if the SSD storage array 475 has space available for data extents associated with five cloud computing instances or jobs, the data extent mover 540 may cause data extents associated with the five cloud computing instances or jobs having the highest job priority, as selected from the cloud computing instances or jobs exceeding the determined I/O wait time threshold, to be moved.

According to another embodiment, when, for multiple cloud computing instances or jobs, the I/O wait time as determined by the input/output wait time determiner 530 exceeds the I/O wait time threshold determined by the input/output wait time threshold determiner 520, the data extent mover 540 may receive information about a customer priority for each of the cloud computing instances or jobs exceeding the determined I/O wait time threshold. The data extent mover 540 may then use the received information about the customer priority to determine particular cloud computing instances or jobs for which to move data extents, if the SSD storage array 475 of the storage system 450 has space, or if space can be made available as discussed above.

This movement may be performed at various times, such as during a period of low usage. The data extent mover 540 may maintain a schedule of times at which data extents may be moved.

By way of a non-limiting example, if the SSD storage array 475 has space available for data extents associated with five cloud computing instances or jobs, the data extent mover 540 may cause data extents associated with the five cloud computing instances or jobs having the highest customer priority, as selected from the cloud computing instances or jobs exceeding the determined I/O wait time threshold, to be moved.

According to yet another embodiment, the data extent mover 540 may use both received information about job priority and customer priority to determine particular cloud computing instances or jobs for which to move data extents, if the SSD storage array 475 of the storage system 450 has space, or if space can be made available as discussed above. This movement may be performed at various times, such as during a period of low usage. The data extent mover 540 may maintain a schedule of times at which data extents may be moved.

By way of a non-limiting example, if the SSD storage array 475 has space available for data extents associated with five cloud computing instances or jobs, the data extent mover 540 may cause data extents associated with the five cloud computing instances or jobs having the highest job priority, as selected from the cloud computing instances or jobs exceeding the determined I/O wait time threshold and associated with customers having the highest customer priority, to be moved.

According to yet another embodiment, when, for multiple cloud computing instances or jobs, the I/O wait time as determined by the input/output wait time determiner 530 exceeds the I/O wait time threshold determined by the input/output wait time threshold determiner 520, the data extent mover 540 may receive information about an estimated storage amount accessed for each of the cloud computing instances or jobs exceeding the determined I/O wait time threshold. The data extent mover 540 may then use the received information about the estimated storage amount accessed as well as information about the available storage space on the SSD storage array 475 to determine particular cloud computing instances or jobs for which to move data extents. This movement may be performed at various times, such as during a period of low usage. The data extent mover 540 may maintain a schedule of times at which data extents may be moved.

According to yet another embodiment, when, for multiple cloud computing instances or jobs, the I/O wait time as determined by the input/output wait time determiner 530 exceeds the I/O wait time threshold determined by the input/output wait time threshold determiner 520, the data extent mover 540 may receive information about a data extent movement rate for data extents accessed by each of the cloud computing instances or jobs exceeding the determined I/O wait time threshold. The data extent movement rate may indicate a time required to move the data extent from the HDD storage array 465 to the SSD storage array 475. The data extent mover 540 may then use the received information about the data extent movement rate as well as information about the expected lifetime as determined by the expected lifetime determiner 500 to determine particular cloud computing instances or jobs for which to move data extents. For example, if, based on the data extent movement rate, it is determined that a data extent associated with a particular cloud computing instance or job cannot be moved prior to the end of the expected lifetime of the cloud computing instance or job, the data extent mover 540 may avoid moving the data extent associated with the particular cloud computing instance or job.

According to an embodiment, the data extent movement rate may be determined using information about a current load and/or expected load of the storage system 450. For example, it may be possible to move data extents more quickly during low-load times (e.g., overnight) without negatively impacting the performance of the storage system 450. On the other hand, it may be necessary to move data extents more slowly during high-load times in order to avoid negatively impacting the performance of the storage system 450.

According to an embodiment, the data extent mover 540 may cause one or more data extents to be moved by sending a request to the storage system 450 to move the data extent(s) from the HDD storage array 465 to the SSD storage array 475. The data extent mover may send this request to the storage controller 480 of the storage system 450. This request may be sent to the storage controller 480 as an application programming interface (API) call.

The storage controller 480 of the storage system 450 may expose an API that provides for various "get" requests and "set" requests. "Get" requests provided for by the API may return information regarding resources available to the storage controller 480 such as information about the HDD storage array 465, the SSD storage array 475, or any other information. "Set" requests provided for by the API may be used to effect movement of specified data extents from the HDD storage array 465 to the SSD storage array 475 as well as movement of specified data extents from the SSD storage array 475 to the HDD storage array 465. The API may provide functionality for specifying what data extents to move, when to move the data extents, and how quickly to move the data extents.

Figure 6:
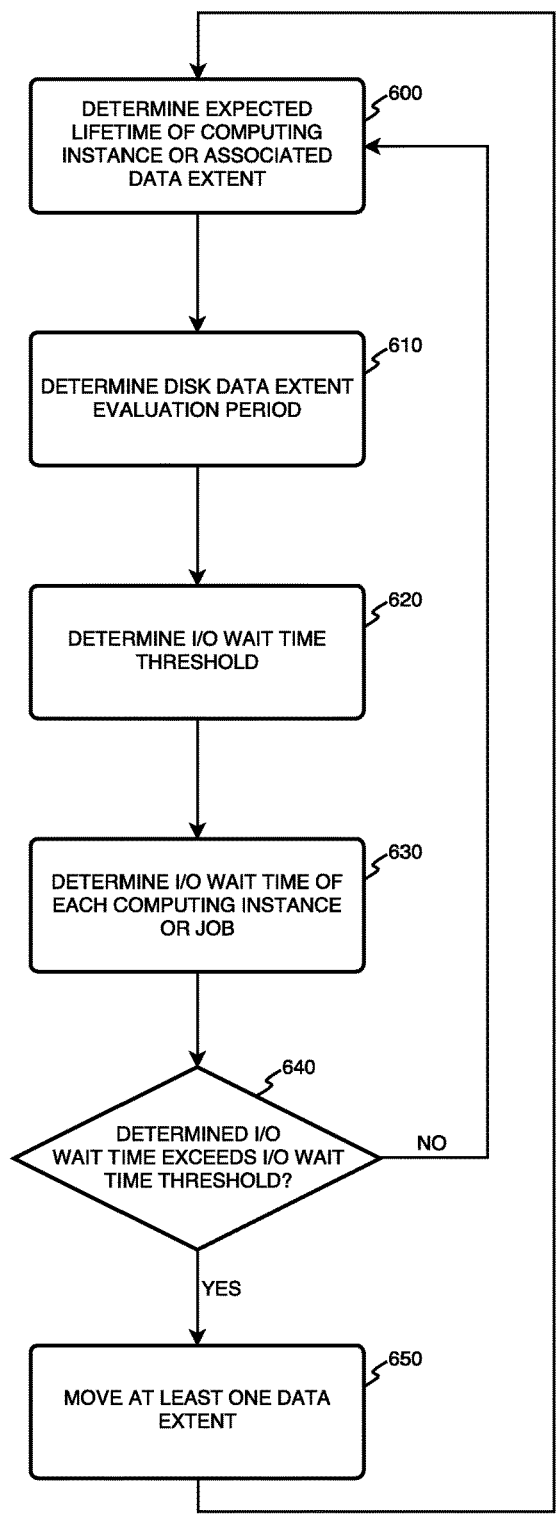
FIG. 6 shows a flowchart of a method in accordance with aspects of the invention.

FIG. 6 depicts exemplary methods in accordance with aspects of the invention. The steps of the method may be performed in the system of FIGS. 4 and 5 and are described with reference to the elements and steps described with respect to FIGS. 4 and 5.

At step 600, the system determines an expected lifetime for each cloud computing instance or job in the cloud computing environment 50, or for one or more data extents stored in the storage system 450 and associated with each cloud computing instance or job in the cloud computing environment 50. In embodiments, as described with respect to FIGS. 4 and 5, step 600 may be performed by an expected lifetime determiner 500 of a cloud control program module 420 running on a cloud controller 410.

At step 610, the system determines a disk data extent evaluation period for each cloud computing instance or job in the cloud computing environment 50, or for one or more data extents stored in the storage system 450 and associated with each cloud computing instance or job in the cloud computing environment 50. In embodiments, as described with respect to FIGS. 4 and 5, step 610 may be performed by a disk data extent evaluation period determiner 510 of a cloud control program module 420 running on a cloud controller 410.

At step 620, the system determines an I/O wait time threshold for each cloud computing instance or job. In embodiments, as described with respect to FIGS. 4 and 5, step 620 may be performed by an input/output wait time threshold determiner 520 of a cloud control program module 420 running on a cloud controller 410.

At step 630, the system determines an I/O wait time for each cloud computing instance or job in the storage system 450. In embodiments, as described with respect to FIGS. 4 and 5, step 630 may be performed by an input/output wait time determiner 530 of a cloud control program module 420 running on a cloud controller 410.

At step 640, the system determines for each cloud computing instance or job whether or not the I/O wait time determined at step 630 exceeds the I/O wait time threshold determined at step 620. In embodiments, as described with respect to FIGS. 4 and 5, step 640 may be performed by a data extent mover 540 running on a cloud controller 410. If the I/O wait time does not exceed the I/O wait time threshold, the flow returns to step 600. On the other hand, if the I/O wait time exceeds the I/O wait time threshold, the flow proceeds to step 650.

At step 650, the system moves at least one data extent. In embodiments, as described with respect to FIGS. 4 and 5, step 650 may be performed by a data extent mover 540 of a cloud control program module 420 running on a cloud controller 410. The flow then returns to step 600 and the method may be repeated.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing storage system performance, the method comprising:

determining, by a computer device, an expected lifetime of each of at least one computing instance;

determining, by the computer device, a disk data extent evaluation period for each of the at least one computing instance based on the determined expected lifetime of the computing instance;

determining, by the computer device, an input/output (I/O) wait time threshold for each of the at least one computing instance;

determining, by the computer device, an I/O wait time of each of the at least one computing instance using the determined disk data extent evaluation period for the computing instance; and in response to the determined I/O wait time of one or more of the at least one computing instance exceeding the determined I/O wait time threshold of the computing instance, moving, by the computer device, at least one data extent associated with the one or more computing instance exceeding the determined I/O wait time threshold from hard disk drive (HDD) storage to solid state drive (SSD) storage.

2. The method according to claim 1, further comprising receiving a job priority for each of the one or more computing instance exceeding the determined I/O wait time threshold, and wherein the moving the at least one data extent comprises determining the at least one data extent to be moved using the received job priority for each of the one or more computing instance exceeding the determined I/O wait time threshold.

3. The method according to claim 2, further comprising receiving a customer priority for each of the one or more computing instance exceeding the determined I/O wait time threshold, and wherein the moving the at least one data extent further comprises using the received customer priority in the determining the at least one data extent to be moved.

4. The method according to claim 1, further comprising receiving an estimated storage amount accessed for each of the one or more computing instance exceeding the determined I/O wait time threshold, and wherein the moving the at least one data extent comprises determining the at least one data extent to be moved using the received estimated storage amount accessed for each of the one or more computing instance exceeding the determined I/O wait time threshold.

5. The method according to claim 1, further comprising determining a data extent movement rate for each of a plurality of data extents, the data extent movement rate indicating a time required to move the data extent from HDD storage to SSD storage, and wherein the moving the at least one data extent comprises determining the at least one data extent to be moved using the determined data extent movement rate and a data extent size for each of the plurality of data extents.

6. The method according to claim 5, wherein the data extent movement rate is determined using information about one of a current load and an expected load of the storage system.

7. The method according to claim 1, wherein the moving the at least one data extent comprises a cloud controller sending a request to move the at least one data extent from HDD storage to SSD storage to a storage controller.

8. A computer program product comprising a computer readable storage medium having program instructions embodied therewith, the program instructions executable by a computer device to cause the computing device to:

determine an expected lifetime of each of at least one data extent associated with at least one computing instance;

determine a disk data extent evaluation period for each of the at least one data extent associated with the at least one computing instance based on the determined expected lifetime of the data extent;

determine an input/output (I/O) wait time threshold for each of the at least one data extent associated with the at least one computing instance;

determine an I/O wait time of each of the at least one data extent associated with the at least one computing instance using the determined disk data extent evaluation period for the data extent; and in response to the determined I/O wait time of one or more of the at least one data extent associated with the at least one computing instance exceeding the determined I/O wait time threshold of the data extent, move at least one of the one or more of the at least one data extent associated with the at least one computing instance exceeding the determined I/O wait time threshold from hard disk drive (HDD) storage to solid state drive (SSD) storage.

9. The computer program product according to claim 8, the program instructions further causing the computing device to receive a job priority for each of the at least one computing instance, and
   wherein the moving the at least one of the one or more of the at least one data extent associated with the at least one computing instance exceeding the determined I/O wait time threshold comprises determining the at least one data extent to be moved using the received job priority for each of the at least one computing instance.

10. The computer program product according to claim 8, the program instructions further causing the computing device to receive an estimated storage amount accessed for each of the one or more computing instance exceeding the determined I/O wait time threshold, and
    wherein the moving the at least one of the one or more of the at least one data extent associated with the at least one computing instance exceeding the determined I/O wait time threshold comprises determining the at least one data extent to be moved using the received estimated storage amount accessed for each of the one or more computing instance exceeding the determined I/O wait time threshold.

11. The computer program product according to claim 8, the program instructions further causing the computing device to determine a data extent movement rate for each of a plurality of data extents, the data extent movement rate indicating a time required to move the data extent from HDD storage to SSD storage, and
    wherein the moving the at least one of the one or more of the at least one data extent associated with the at least one computing instance exceeding the determined I/O wait time threshold comprises determining the at least one data extent to be moved using the determined data extent movement rate and a data extent size for each of the plurality of data extents.

12. The computer program product according to claim 11, wherein the data extent movement rate is determined using information about one of a current load and an expected load of the storage system.

13. The computer program product according to claim 8, wherein the moving the at least one data extent comprises a cloud controller sending a request to move the at least one data extent from HDD storage to SSD storage to a storage controller.

14. A system comprising:
    a storage system comprising hard disk drive (HDD) storage and solid state drive (SSD) storage; and
    a controller comprising:
        at least one hardware processor;
        an expected lifetime determiner configured to determine an expected lifetime of each of at least one computing instance, using the at least one hardware processor;
        a disk data extent evaluation period determiner configured to determine a disk data extent evaluation period for each of the at least one computing instance based on the expected lifetime of the computing instance determined by the expected lifetime determiner, using the at least one hardware processor;
        an input/output (I/O) wait time threshold determiner configured to determine an I/O wait time threshold for each of the at least one computing instance using the at least one hardware processor;
        an I/O wait time determiner configured to determine an I/O wait time of each of the at least one computing instance using the disk data extent evaluation period for the computing instance determined by the disk data extent evaluation period determiner, using the at least one hardware processor; and
        a data extent mover configured to, in response to the I/O wait time of one or more of the at least one computing instance determined by the I/O wait time determiner exceeding the I/O wait time threshold of the computing instance determined by the I/O wait time threshold determiner, move at least one data extent associated with the one or more computing instance exceeding the determined I/O wait time threshold from the HDD storage in the storage system to the SSD storage in the storage system.

15. The system according to claim 14, wherein the data extent mover is further configured to:
    receive a job priority for each of the one or more computing instance exceeding the determined I/O wait time threshold; and
    determine the at least one data extent to be moved using the received job priority for each of the one or more computing instance exceeding the determined I/O wait time threshold.

16. The system according to claim 14, wherein the data extent mover is further configured to:
    receive an estimated storage amount accessed for each of the one or more computing instance exceeding the determined I/O wait time threshold; and
    determine the at least one data extent to be moved using the received estimated storage amount accessed for each of the one or more computing instance exceeding the determined I/O wait time threshold.

17. The system according to claim 14, wherein the data extent mover is further configured to:
    determine a data extent movement rate for each of a plurality of data extents, the data extent movement rate indicating a time required to move the data extent from HDD storage to SSD storage; and
    determine the at least one data extent to be moved using the determined data extent movement rate and a data extent size for each of the plurality of data extents.

18. The system according to claim 17, wherein the data extent mover determines the data extent movement rate using information about one of a current load and an expected load of the storage system.

19. The system according to claim 14, wherein the storage system further comprises a storage controller, and
   wherein the data extent mover is configured to send a request to the storage controller in the storage system to move the at least one data extent from the HDD storage in the storage system to the SSD storage in the storage system.

20. The system according to claim 14, wherein the controller is a cloud computing controller.

* * * * *